United States Patent Office 3,423,415
Patented Jan. 21, 1969

3,423,415
4 - [N - (3,3 - DIPHENYL - PROPYL) - AMINO] - 1-METHYL-3-PHENYL-PIPERIDINE AND INTERMEDIATES THERETO
Ernst Jucker, Ettingen, and Rudolf Süess, Bettingen, Switzerland, assignors to Sandoz Ltd. (also known as Sandoz A.G.), Basel, Switzerland
No Drawing. Filed Mar. 19, 1965, Ser. No. 441,350
Claims priority, application Switzerland, Mar. 25, 1964, 3,992/64
U.S. Cl. 260—293
Int. Cl. C07d 29/28; A61k 25/00
2 Claims

ABSTRACT OF THE DISCLOSURE

Compound of formula

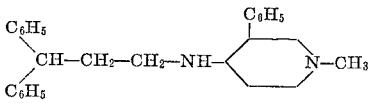

I in which two asymmetric carbon atoms are present, and their acid addition salts, have significant coronary dilative activity. The compounds have low toxicity and are valuable in the treatment of angina pectoris and stenocardiac illnesses. The compound can be produced by reacting 1-methyl-3-phenyl-4-amino piperidine with (a) a 3,3-diphenylpropionic acid halide and the reaction product reduced or (b) 3,3-diphenyl-propionic aldehyde and the reaction product reduced or (c) a 3,3-diphenyl-propyl halide or alternatively, 1-methyl-3-phenyl-4-piperidone can be reacted with 3,3-diphenyl-propyl amine and the reaction product reduced.

---

The present invention relates to new heterocyclic compounds and processes for their production.

The present invention provides heterocyclic compounds of Formula I.

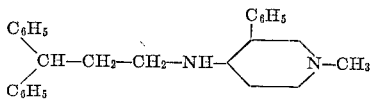

I and their acid addition salts.

The compounds of Formula I have two asymmetric carbon atoms in the piperidine ring, two different racemates have been isolated and each can be separated into its stereoisomers each of which, together with the two racemates, is included in the above Formula I.

The present invention further provides processes for the production of compounds of Formula I and their acid addition salts, characterized in that either (a) a piperidyl amine of Formula II,

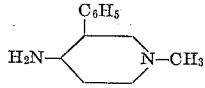

II is reacted with a 3,3-diphenyl-propionic acid halide in which Halide signifies chlorine, bromine or iodine and the reaction product is reduced, or
(b) said compound of Formula II is reacted with a 3,3-diphenyl-propionic aldehyde and the reaction product is reduced, or
(c) said compound of Formula II is reacted with a 3,3-diphenyl-propyl halide in which halide signifies chlorine bromine or iodine, or (d) a piperidone derivative of Formula III,

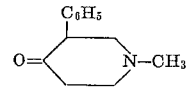

III is reacted with 3,3-diphenyl-propyl amine and the reaction product is reduced and, when an acid addition salt is desired, salification is effected. By using method (a), (b) and (d) there is obtained an intermediate of Formula IV.

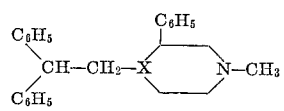

IV in which X represents

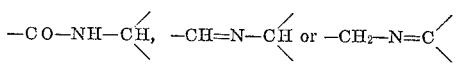

For methods (a), (b) and (c) 1-methyl-3-phenyl-4-amino-piperidine (II) is used as starting material which already contains two asymmetric carbon atoms and therefore occurs in the form of two different racemates. If required, these may be separated in the usual manner, e.g. by chromatography, distillation or fractional crystallization of their salts. Each of the two racemates of 1-methyl-3-phenyl-4-amino-piperidine may be worked up individually, there being obtained the end products of Formula I in the form of the corresponding separate racemates. The reactions may likewise be effected with a mixture of the racemates of the two epimeric 1-methyl-3-phenyl-4-amino-piperidines, the final products being of course obtained in the form of a similar mixture, which—in manner similar to that for the starting material amines—may be separated by the usual methods. In the method (a) the X in the intermediate product of Formula IV significes the radical

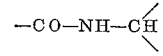

when a racemate mixture of the amines of Formula II is used as starting material the separation of the two racemates may be effected at this stage and then the reduction of the racemic intermediates (IV, X as mentioned above) effected.

1-methyl-3-phenyl-4-amino-piperidine is produced by converting the hitherto known racemic 1-methyl-3-phenyl-4-oxo-piperidine into its oxime with the aid of a hydroxylamine salt and reducing this in known manner; examples of reducing agents which may be used are: lithium aluminium hydride, sodium borohydride, sodium or aluminium amalgam in alcohol or catalytically activated hydrogen. Reduction may also be effected electrolytically. On reduction, a mixture of the two racemates of 1-methyl-3-phenyl-4-amino-piperidine is usually obtained; the percentage composition of the stereoisomer mixture may vary according to the reduction conditions.

For method (d), it is preferable to effect the reaction in the presence of glacial acetic acid, zinc chloride or p-toluenesulphonic acid though this is not essential. Heating also enhances the reaction. The reaction of 1-methyl-3-phenyl-4-amino-piperidine with a 3,3-diphenyl-propionic acid halide according to method (a) is advantageously effected in an inert solvent, e.g. benzene, toluene or chloroform, at room temperature or at a slightly elevated temperature, if required in the presence of an acid binding agent. The reduction of the resulting acid amide (Formula IV,

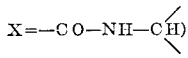

may, for example, be effected with lithium aluminium hydride or with diborane in anhydrous tetrahydrofuran.

The reaction of a piperidyl amine of Formula II with 3,3-diphenyl-propionic aldehyde according to method (b) may be effected with or without an inert solvent at room temperature or at an elevated temperature, whereby the water which is split off may optionally be continuously removed from the reaction mixture. The condensation of 1-methyl-3-phenyl-4-oxo-piperidine (III) with 3,3-diphenyl-propyl-amine according to method (d) is effected in analogous manner. The intermediates produced according to methods (b) and (d) are advantageously not isolated, but used as such for the subsequent reduction for which there may be used, for example, a complex metal hydride or catalytically activated hydrogen.

When compounds of Formula I are produced according to method (d) the second centre of asymmetry is formed in the last stage, i.e. on reduction of the intermediate of Formula IV, in which

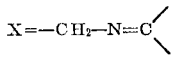

A mixture of the racemates of Formula I usually results which may be separated into the two uniform racemates by a method known per se, e.g. chromatography and fractional crystallization. It is also possible, however, to select reduction conditions whereby hydrogenation is effected in such a manner that the addition of hydrogen occurs stereospecifically and hence a great excess of one of the two possible diastereoisomer pairs results; this is the case when reduction is effected with catalytically activated hydrogen.

Compounds of Formula I were hitherto unknown. At room temperature they are solid, crystalline or oily compounds; with organic or inorganic acids they form stable salts which are usually well crystallized. Examples of acids for acid addition salt formation are: hydrochloric, hydrobromic, sulphuric, methanesulphonic, p-toluenesulphonic, maleic, fumaric, malic, tartaric, benzoic and hexahydrobenzoic acid.

Compounds of Formula I have valuable pharmacodynamic effects on the heart and on the blood circulation. They have a marked coronary dilative effect which may be detected on the isolated perfused heart. The compounds of Formula I, furthermore, have local anaesthetic properties; the toxicity of these compounds is relatively low in comparison with their effectiveness and they are, therefore, indicated for use in therapy, especially in the prolonged treatment of angina pectoris and stenocardiac illnesses.

A number of known compounds are recommended for the therapy of coronary insufficiency, including one of which the constitution has a certain similarity with some structural elements of the compounds of Formula I. When compared with the last mentioned known compound, the compound of Example 1 exhibits a similar stimulation of coronary blood circulation whilst its peripheral vascular dilative effect is weaker, i.e. its coronary effect is more specific. Another advantage of the compound of Example 1 is that it does not show a tendency towards a negative intropic effect, i.e. an effect decreasing the force of cardiac contractions, and it slightly inhibits the β receptors of the adrenergic system. The undesired sympathicotonus in coronary patients may, therefore, be weakened to a certain extent without the appearance of heart insufficiency which is occasionally observed with the use of effective β receptor blockers. Finally, in compounds of Formula I the range between the perorally active maintenance dosage and the chronically tolerated, but already clearly toxic dosage (therapeutical range) is considerably wider. In view of the aforementioned similarity of certain structural elements it was not expected to find such qualitative differences in the compounds of the invention.

The compounds of Formula I are indicated for use as pharmaceuticals on their own or in the form of appropriate medicinal preparations for enteral or parenteral administration. In order to produce appropriate medicinal preparations the compounds are worked up with inorganic or organic adjuvants which are inert and physiologically acceptable. Examples of such adjuvants are:

Tablets and dragées: lactose, starch, talc and stearic acid;
Injectable solutions: water, alcohols, glycerin and vegetable oils;
Suppositories: natural or hardened oils and waxes.

The preparations may furthermore contain suitable preserving, stabilizing and wetting agents, solubilizers, sweetening and colouring substances and flavourings.

The present invention therefore further provides pharmaceutical preparations containing, in addition to a physiologically acceptable carrier, a compound of Formula I and/or an acid addition salt thereof.

The following examples illustrate the invention, temperatures being stated in degrees centigrade and melting points being corrected.

Example 1.—4-[N-(3,3-diphenylpropyl)-amino]-1-methyl-3-phenyl-piperidine/isomer A Method a 40.3 g. of 1-methyl-3-phenyl-4-amino-piperidine (mixture of isomers, boiling point 76–83°/0.07 mm. Hg) are dissolved in 130 ml. of methylene chloride in a sulphonating flask. Cooling is effected with ice water and a solution of 51.3 g. of 3,3-diphenyl-propionic acid chloride in 150 ml. of methylene chloride is added dropwise at 5° during the course of 2½ hours. The yellow coloured, clear reaction solution is subsequently stirred at room temperature for 18 hours and heating to the boil at reflux is then effected for one hour. The methylene chloride is evaporated, the residue is dissolved in 200 ml. of water, an excess of saturated potassium carbonate solution is added to the solution and the precipitated oil is taken up in methylene chloride. The methylene chloride solution is washed once with water, subsequently dried over sodium sulphate and the solvent is evaporated; a yellow, viscous oil is obtained. This oil is chromatographed on 2.7 kg. of neutral aluminium oxide in order to separate it into its two epimeric components, whereby the isomer A' of 4-[N-(3,3 - diphenyl - propionyl) - amino] - 1 - methyl - 3-phenyl-piperidine is eluted with mixtures of benzene/petroleum ether/ether and the isomer B' is eluted with mixtures of methylene chloride/ethanol. The intermediate fraction, eluted with pure ether, contains a mixture of the two isomers. Melting point of isomer A': 127–129° after recrystallization from ether. Melting point of isomer B': 166–168° after recrystallization from benzene/petroleum ether.

21.0 g. of 4-[N-3,3-diphenyl-propionyl)-amino]-1-methyl-3-phenyl-piperidine having a melting point of 127–129° (isomer A') are heated to the boil at reflux for 16 hours together with 4.0 g. of lithium aluminium hydride in 1300 ml. of absolute ether. Cooling is effected and ethyl acetate is added until the excess of reducing agent is used up. Saturated sodium sulphate solution is then added until the precipitate which separates has a grainy, filterable form. The precipitate is filtered off and the filtrate is dried over sodium sulphate. After evaporation of the solvent the resulting reduction product has the form of a yellow, viscous oil; it is taken up in a small amount of ethanol and 52.6 ml. of a 2 N ethanolic hydrochloric acid solution are added until a weak acid reaction to Congo red indicator is obtained. Crystallization occurs spontaneously and is completed by the addition of a small amount of ether. After leaving to stand in a refrigerator the 4-[N-(3,3-diphenyl-propyl)-amino]-1-methyl-3-phenyl-piperidine dihydrochloride is filtered off; melting point 287–289° (decomposition).

For conversion into the free base 3 g. of the dihydrochloride are dissolved in 5 ml. of water, 10 ml. of saturated potassium carbonate solution are added and the precipitated oil is extracted a number of times with ether. The combined ether extracts are washed with saturated sodium chloride solution, dried over sodium sulphate and the solvent is then evaporated. The oily residue is distilled in a high vacuum; boiling point 195°/0.1 mm. Hg (temperature of the air bath). The resulting viscous oil does not crystallize even after standing for a long time.

The starting materials may be produced as follows:

(a) 1-methyl-3-phenyl-4-oximino-piperidine

A solution of 8.8 g. of hydroxylamine hydrochloride in 25 ml. of methanol is added dropwise whilst stirring at a temperature of 15° to a solution of 20.0 g. of racemic 1-methyl-3-phenyl-4-oxo-piperidine in 25 ml. of methanol in a sulphonating flask. Stirring at room temperature for 18 hours, heating to the boil for a short time, cooling and filtration are then effected. 20.2 g. of 1-methyl-3-phenyl-4-oximino-piperidine hydrochloride are obtained; after recrystallization from methanol the compound melts at 232° with decomposition. For the conversion into the free base the crude filter residue of 1-methyl-3-phenyl-4-oximino-piperidine hydrochloride is dissolved in a small amount of water, a saturated potassium carbonate solution is added to the solution and the material which first separates as an oil and then crystallizes, is filtered off. After recrystallization from methanol/ethanol 1-methyl-3-phenyl-4-oximino-piperidine melts at 156–157°.

(b) 1-methyl-3-phenyl-4-amino-piperdine 13.1 g. of 1-methyl-3-phenyl-4-oximino-piperidine are dissolved in 180 ml. of methanol and hydrogenation is effected with Raney nickel as catalyst whilst shaking at 55° and 6 atmospheres of pressure. After half an hour 3050 ml. of hydrogen have been taken up, corresponding to 95% of the theoretical amount and hydrogenation then stops. After cooling the catalyst is filtered off, the filtrate is evaporated and the residue is distilled in a high vacuum in an atmosphere of nitrogen, whereby a mixture of isomers of 1-methyl-3-phenyl-4-aminopiperdine, having a boiling point of 76–83°/0.07 mm. Hg is obtained in the form of a very mobile colourless oil.

Example 2.—4-[N-(3,3-diphenyl - propyl) - amino]-1-methyl 3-phenyl-piperidine/isomer B Method a 5.4 g. of 4-[N-(3,3-diphenyl-propionyl) - amino]-1-methyl-3-phenyl-piperidine, having a melting point of 166–168° (isomer B') are heated to the boil at reflux for 24 hours in 400 ml. of absolute tetrahydrofuran together with 2.5 g. lithium aluminium hydride. Cooling is effected and ethyl acetate is added until the excess of reducing agent is used up. Saturated sodium sulphate solution is then added until the precipitate which separates has a grainy, filterable form. The precipitate is filtered off and the filtrate is dried over sodium sulphate. After evaporation of the solvent the resulting reduction product has the form of a yellow viscous oil; it is taken up in a small amount of ethanol and the solution is heated to the boil with 3.3 g. of maleic acid. A colourless precipitate separates which is filtered off after standing in a refrigerator. After recrystallization from methanol colourless crystals having a melting point of 205° (bubble formation) are obtained; 1 molecule of the base binds 2 molecules of maleic acid.

The maleate is converted into a free base by dissolving 5.0 g. of the salt in 15 ml. of water and adding 20 ml. of saturated potassium carbonate solution. The precipitated oil is extracted several times with ether, the combined ether extracts are washed with saturated sodium chloride solution, dried over sodium sulphate and the solvent is evaporated. The residue forms a yellow viscous oil which crystallizes upon standing. After recrystallization from acetone the base melts at 97–98°.

Example 3.—4-[N-(3,3-diphenyl-propyl)amino-1-methyl-3-phenyl-piperidine

Method b

A solution of 10.0 g. of 1-methyl-3-phenyl-4-aminopiperidine (mixture of isomers produced by hydrogenation of 1-methyl-3-phenyl-4-oximino-piperidine in the present of Raney nickel, boiling point 76–83°/0.07 mm. Hg) and 11.1 g. of 3,3-diphenyl-propionic aldehyde in 100 ml. of absolute benzene is heated to the boil for one hour with the addition of 1 ml. of glacial acetic acid in a flask provided with reflux condenser and a continuously operating water separator. The benzene is then evaporated, the residue is dissolved in 150 ml. of ethanol and hydrogenation is effected with 300 mg. of platinum oxide as catalyst in a hydrogenation apparatus according to Parr at 5 atmospheres pressure and 40° for 5 hours. The catalyst is filtered off, the solvent is evaporated and the remaining mixture is chromatographed on 500 g. of neutral aluminium oxide. The mixture of the stereoisomeric 4-[N-(3,3 - diphenyl - propyl)-amino]-1-methyl-3-phenyl-piperidines, which had been adsorbed on the aluminium oxide from benzene/petroleum ether 1:3. is eluted, isomer A (which adheres to the aluminium oxide less strongly) being obtained in the form of a viscous oil using benzene/petroleum ether 1:1 and 3:1 and also benzene alone. With ethanolic hydrochloric acid solution this oil yields a dihydrochloride having a melting point of 286–289° (decomposition) which crystallizes easily from ethanol. The isomer B which adheres more strongly to the aluminium oxide is washed out with ether and ether/chloroform 1:1. The compound crystallizes even in the form of the free base and has a melting point of 97–98° after recrystallization from acetone.

Example 4.—4-[N-(3,3-diphenyl-propyl)-amino]-1-methyl-3-phenyl-piperidine

Method c

A solution of 4.6 g. of 3,3-diphenyl-propyl-chloride and 3.8 g. of 1-methyl-3-phenyl-4-amino-piperidine (production in a manner analogous to that described in the preceding example) in 75 ml. of toluene is heated at reflux whilst stirring for 4 hours. The solution is then shaken out well three times with a total of 150 ml. of 2 N hydrochloric acid, potassium carbonate is added to the combined hydrochloric acid phases until a strong alkaline reaction is obtained and the precipitated material is taken up in benzene. The benzene solution is washed with water, dried over sodium sulphate, the solvent is evaporated and chromatography is effected on 250 g. of neutral aluminium oxide in a manner analogous to that described in the preceding example. The isomeric 4-[N-(3,3-diphenyl-propyl)-amino]-1-methyl - 3 - piperidines obtained in this manner are identical in every respect with those of the preceding example.

Example 5.—4-[N-(3,3-diphenyl-propyl)-amino]-1-methyl-3-phenyl-piperidine/isomer A Method d 410 g. of 3,3-diphenyl-propyl-amine, 367 g. of 1-methyl-3-phenyl-4-oxo-piperidine and 30 ml. of glacial acetic acid in 2500 ml. of benzene are heated to the boil at reflux in a flask provided with reflux condenser and continuously operating water separator. After 5 hours 34 ml. of water—corresponding to 99% of the theoretical amount—have been split off. The benzene is then distilled off, the residue in the flask is dissolved in 1000 ml. of ethanol and evaporation is effected once more. The residue is taken up in 3500 ml. of ethanol, 7 g. of platinum oxide are added and hydrogenation is effected at normal pressure and 40°. After 5 hours 47 litres (94% of the theoretical amount) of water have been taken up and hydrogenation then practically stops. The catalyst is filtered off, the filtrate is concentrated to two-thirds of its volume and 1950 ml. of ethanolic 2 N hydrochloric acid solution are added whilst cooling and stirring. The mixture is left to crystallize in a refrigerator for 24 hours and filtration is effected. After recrystallization from methanol and filtration over animal charcoal the 4-[N-(3,3-diphenyl-propyl)-amino] - 1 - methyl - 3 - phenyl-piperidine hydrochloride melts at 286–289° (decomposition).

What is claimed is:
1. A compound of the formula

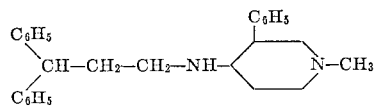   I and its physiologically acceptable acid addition salts.

2. A compound of the formula

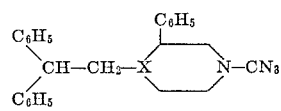   II in which X is a member selected from the group consisting of

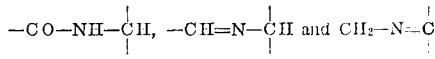

References Cited

UNITED STATES PATENTS

| | | | |
|---|---|---|---|
| 3,117,127 | 1/1964 | Gubitz | 260—294 |
| 3,272,806 | 9/1966 | Winterstein | 260—240 |
| 3,284,465 | 11/1966 | Scola | 260—293 |
| 3,313,822 | 4/1967 | Meltzer | 260—240 |

OTHER REFERENCES

Harsanyi et al., J. Med. Chem., vol. 7 (5) 623–5 (64).

HENRY R. JILES, *Primary Examiner.*

E. LEWIS, *Assistant Examiner.*

U.S. Cl. X.R.

260—294, 240, 999